(12) United States Patent
Ike

(10) Patent No.: US 7,533,538 B2
(45) Date of Patent: May 19, 2009

(54) DEHUMIDIFIER

(75) Inventor: Hidetoshi Ike, Yokohama (JP)

(73) Assignee: Kankyo Co., Ltd., Yokohama-Shi (JP)

( * ) Notice: Subject to any disclaimer, the term of this patent is extended or adjusted under 35 U.S.C. 154(b) by 596 days.

(21) Appl. No.: 10/513,856

(22) PCT Filed: May 9, 2003

(86) PCT No.: PCT/JP03/05817

§ 371 (c)(1),
(2), (4) Date: Jul. 8, 2005

(87) PCT Pub. No.: WO03/095903

PCT Pub. Date: Nov. 20, 2003

(65) Prior Publication Data

US 2006/0015974 A1     Jan. 19, 2006

(30) Foreign Application Priority Data

May 10, 2002 (JP) ............................. 2002-135569

(51) Int. Cl.
*F25D 23/00* (2006.01)
(52) U.S. Cl. .................. 62/271; 62/94; 165/10
(58) Field of Classification Search ................ D23/364; 62/94, 314, 332, 315, 271; 165/10
See application file for complete search history.

(56) References Cited

U.S. PATENT DOCUMENTS 4,729,774 A    3/1988 Cohen et al.
6,083,304 A    7/2000 Fujimura
2004/0237540 A1*  12/2004 Okano et al. .............. 60/784

FOREIGN PATENT DOCUMENTS

| JP | 62-180720 A | 8/1987 |
| JP | 10-47705 A | 2/1998 |
| JP | 10-047705 A | 2/1998 |

(Continued)

*Primary Examiner*—William E Tapolcai
(74) *Attorney, Agent, or Firm*—Birch, Stewart, Kolasch & Birch, LLP

(57) ABSTRACT

A dehumidifier by which the rate of heat recovery by the heat exchanger for recovering heat can be increased, the power consumption of the heater can be decreased, and by which the amount of dehumidification per a power consumption can be promoted, is disclosed. The dehumidifier 1 comprises a rotor case 31 harboring a dehumidification rotor 2 rotatably and drivably mounted therein, having an opening for dehumidification 38 through which air to be dehumidified passes, and having an opening for regeneration 39 through which air for regeneration passes; a heater 5 for heating the air for regeneration before passing through the opening for regeneration; a heat exchanger for recovering heat 7 which transfers heat of the air for regeneration passing through the second passage section to the air for regeneration passing through the first passage section; a dehumidification passage X harboring a dehumidification fan 3; and a regeneration passage Y harboring a regeneration fan 4. The direction of rotation of the dehumidification rotor 2 is set such that the air for regeneration which passed through posterior area C of the dehumidification rotor flows into downstream portion in the second passage section, and that the air for regeneration which passed through anterior area H of the dehumidification rotor flows into upstream portion in the second passage section.

10 Claims, 8 Drawing Sheets

FOREIGN PATENT DOCUMENTS

| | | |
|---|---|---|
| JP | 11-207134 A | 8/1999 |
| JP | 11-300145 A | 11/1999 |
| JP | 11-300146 A | 11/1999 |
| JP | 2000-15041 A | 1/2000 |
| JP | 2000-337661 A | 12/2000 |
| JP | 2001-099451 A | 4/2001 |
| JP | 2001-99451 A | 4/2001 |

* cited by examiner

DEHUMIDIFIER

TECHNICAL FIELD

The present invention relates to a dehumidifier having a dehumidification rotor and a heat exchanger for recovering heat.

BACKGROUND ART

A dehumidifier 1 comprising a rotatably and drivably mounted disk-shaped dehumidification rotor, as shown in FIG. 6, for example, is known (e.g., U.S. Pat. No. 6,083,304). The dehumidifier 1 comprises a passage for dehumidification X through which air to be dehumidification is introduced into the dehumidifier 1 from outside by a dehumidification fan 3 so as to dehumidify the air by passing through a dehumidification rotor 2, and through which the dehumidified air is discharged to outside; and a passage for regeneration Y through which air for regeneration for regenerating the dehumidification rotor 2 is circulated in the dehumidifier 1.

This passage for regeneration Y comprises a regeneration fan 4 for circulating the air for regeneration in a closed circuit, a heater 5 for heating the air for regeneration before passing through the dehumidification rotor 2, and a heat exchanger for cooling 6 which cools the air for regeneration after passing through the dehumidification rotor 2. The passage for regeneration Y further comprises a heat exchanger for recovering heat 7 for raising the temperature of the air for regeneration before passing through the dehumidification rotor 2 utilizing the temperature of the air for regeneration after passing through the dehumidification rotor 2. By virtue of the heat exchanger for recovering heat 7, the temperature of the air for regeneration before passing the heater 5 is raised so as to decrease the power consumption of the heater 5, thereby saving energy.

The dehumidification rotor 2 is harbored in a rotor case 31, and is rotated at a very slow rotation speed of, for example, once per 3 minutes, for example. In the rotor case 31, an opening for dehumidification 38 which is so formed as to expose a region of the dehumidification rotor 2, which region is so defined as to have a prescribed central angle in the dehumidification rotor 2, and an opening for regeneration 39 located in the passage for regeneration which is so formed as to expose a region of the dehumidification rotor, which is located in an area other than the first-mentioned region having the prescribed central angle, are formed, through which openings the air to be dehumidified and the air for regeneration for regenerating the dehumidification rotor 2 pass, respectively.

The air to be dehumidified inhaled into the dehumidifier 1 through the passage for regeneration X is made to pass through the opening for dehumidification 38, during which the moisture in the air is adsorbed by the dehumidification rotor 2, thereby being dehumidified, and then discharged to outside. On the other hand, the region of the dehumidification rotor 2, which adsorbed the moisture, enters the opening for regeneration 39 from the opening for dehumidification 38, thereby being regenerated by the air for regeneration and exhaling the adsorbed moisture. The moisture exhaled from the dehumidification rotor 2, in the form of vapor, flows in the passage for regeneration, cooled by the heat exchanger for cooling so as to be condensed, and the thus formed condensed water drops onto a drain pan and is collected in a reservoir tank 26.

Although the directions of the air to be dehumidified and of the air for regeneration, passing through the dehumidification rotor, are opposite in the mode shown in FIG. 6, a mode in which these directions are the same, as shown in FIG. 7, is also known. Although the principle of dehumidification and the operation of the mode shown in FIG. 7 are the same as those of the mode shown in FIG. 6, the difference in pressure between the entrance of the region for dehumidification (the region in the dehumidification rotor, through which the air to be dehumidified passes) and the entrance of the region for regeneration (the region in the dehumidification rotor, through which the air for regeneration passes), as well as the difference in pressure between the exit of the region for dehumidification and the exit of the region for regeneration, can be made smaller than in the mode shown in FIG. 6 in which the directions of the air to be dehumidified and the air for regeneration are opposite, so that it is preferred.

With the conventional dehumidifiers (FIGS. 6 and 7) having the above-described constitutions, at a time point, the anterior area in the dehumidification rotor 2, located anterior in the direction of rotation of the dehumidification rotor 2, has dwelled for a longer time in the opening for regeneration 39 than the posterior area in the dehumidification rotor 2, located posterior in the direction of rotation of the dehumidification rotor 2, so that the anterior area has been exposed to the heated air for regeneration for a longer time. Therefore, the air for regeneration after passing through the anterior area is hotter than the air for regeneration after passing through the posterior area.

DISCLOSURE OF THE INVENTION

With the conventional dehumidifiers, the entire air for regeneration after passing through the opening for regeneration 39 is mixed and is flown to the heat exchanger for recovering heat 7 in spite of the fact that there is a difference in temperature depending on the position in the opening for regeneration 39 and so the temperature of the air for regeneration varies depending on the position of the area through which the air for regeneration passes.

Thus, the air for regeneration having a high temperature, which passed through the anterior area in the dehumidification rotor is cooled by the air for regeneration having a low temperature, which passed through the posterior area in the dehumidification rotor, so that the temperature of the entire air for regeneration is lowered and so the rate of heat recovery by the heat exchanger for recovering heat 7 is decreased. As a result, it is difficult to raise the temperature of the air to be transferred to the heater 5, so that the amount of dehumidification per a power consumption is low, which is problematic.

The present invention was made in view of the above-mentioned problem, and an object thereof is to provide a dehumidifier by which the rate of heat recovery by the heat exchanger for recovering heat can be increased, the power consumption of the heater can be decreased, and by which the amount of dehumidification per a power consumption can be promoted.

The present inventor intensively studied to infer that the rate of heat recovery by the heat exchanger for recovering heat can be increased, and in turn, the power consumption of the heater can be decreased and the amount of dehumidification per a power consumption can be promoted, by improving the constitution of the heat exchanger for recovering heat and the direction of rotation of the dehumidification rotor, or by providing a flow guide plate which guides the air for regeneration after passing through the dehumidification rotor to prescribed positions in the heat exchanger for recovering heat so that the relatively hot air for regeneration which passed through the hot region in the dehumidification rotor is made to move in one of the passages in the heat exchanger for recovering heat for a long distance so as to subject the air to heat exchange for a relatively long time, and that the relatively cool air for regeneration which passed through the relatively cool region in the dehumidification rotor is made to move in one of the passages in the heat exchanger for recovering heat for a short distance so as to subject the air to heat exchange for a relatively short time, thereby completing the present invention.

That is, the present invention provides a dehumidifier comprising:

a rotor case harboring a disk-shaped dehumidification rotor rotatably and drivably mounted therein, the rotor case having an opening for dehumidification through which air to be dehumidified passes, which opening is so formed as to expose a region of the dehumidification rotor, the region being so defined as to have a prescribed central angle in the dehumidification rotor, and the rotor case having an opening for regeneration through which air for regeneration that regenerates the dehumidification rotor passes, which opening for regeneration is so formed as to expose a region of the dehumidification rotor, which second-mentioned region is so defined as to have a central angle and to be located in an area other than the first-mentioned region;

a heater for heating the air for regeneration before passing through the opening for regeneration;

a heat exchanger for recovering heat, which is separated into a first passage section through which the air for regeneration before passing through the opening for regeneration passes, and a second passage section through which the air for regeneration after passing through the opening for regeneration passes, which heat exchanger has a separation wall section that transfers heat of the air for regeneration passing through the second passage section to the air for regeneration passing through the first passage section;

a dehumidification passage harboring a dehumidification fan that inhales the air to be dehumidified from outside and discharges the air after passing through the opening for dehumidification; and a regeneration passage harboring a regeneration fan which flows the air for regeneration through the first passage section, the heater, the opening for regeneration and the second passage section, in the order mentioned;

wherein the direction of rotation of the dehumidification rotor is set such that the air for regeneration which passed through posterior area of the dehumidification rotor flows into downstream portion in the second passage section, which posterior area is located posterior in the direction of rotation, and that the air for regeneration which passed through anterior area of the dehumidification rotor flows into upstream portion in the second passage section, which anterior area is located anterior in the direction of rotation.

The present invention also provides a dehumidifier comprising:

a rotor case harboring a disk-shaped dehumidification rotor rotatably and drivably mounted therein, the rotor case having an opening for dehumidification through which air to be dehumidified passes, which opening is so formed as to expose a region of the dehumidification rotor, the region being so defined as to have a prescribed central angle in the dehumidification rotor, and the rotor case having an opening for regeneration through which air for regeneration that regenerates the dehumidification rotor passes, which opening for regeneration is so formed as to expose a region of the dehumidification rotor, which second-mentioned region is so defined as to have a central angle and to be located in an area other than the first-mentioned region;

a heater for heating the air for regeneration before passing through the opening for regeneration;

a heat exchanger for recovering heat, which is separated into a first passage section through which the air for regeneration before passing through the opening for regeneration passes, and a second passage section through which the air for regeneration after passing through the opening for regeneration passes, which heat exchanger has a separation wall section that transfers heat of the air for regeneration passing through the second passage section to the air for regeneration passing through the first passage section;

a dehumidification passage harboring a dehumidification fan that inhales the air to be dehumidified from outside and discharges the air after passing through the opening for dehumidification;

a regeneration passage harboring a regeneration fan which flows the air for regeneration through the first passage section, the heater, the opening for regeneration and the second passage section, in the order mentioned; and a flow guide plate which guides the air for regeneration that passed through anterior area of the dehumidification rotor to the upstream portion in the second passage section, the anterior area being located anterior in the direction of rotation, and which guides the air for regeneration that passed through the posterior area of the dehumidification rotor to the downstream portion in the second passage section, the posterior area being located posterior in the direction of rotation, which flow guide plate is arranged in the passage for regeneration at a position downstream of the opening for regeneration.

According to the present invention, as mentioned above, the rate of heat recovery by the heat exchanger for recovering heat may be increased by improving the constitution of the heat exchanger for recovering heat and the direction of rotation of the dehumidification rotor, or by providing a flow guide plate which guides the air for regeneration after passing through the dehumidification rotor to prescribed positions in the heat exchanger for recovering heat so that the relatively hot air for regeneration which passed through the hot region in the dehumidification rotor is made to move in one of the passages in the heat exchanger for recovering heat for a long distance so as to subject the air to heat exchange for a relatively long time, and that the relatively cool air for regeneration which passed through the relatively cool region in the dehumidification rotor is made to move in one of the passages in the heat exchanger for recovering heat for a short distance so as to subject the air to heat exchange for a relatively short time. Therefore, the power consumption by the heater can be decreased and the amount of dehumidification per a power consumption can be increased.

MODE FOR CARRYING OUT THE INVENTION

Figure 6:
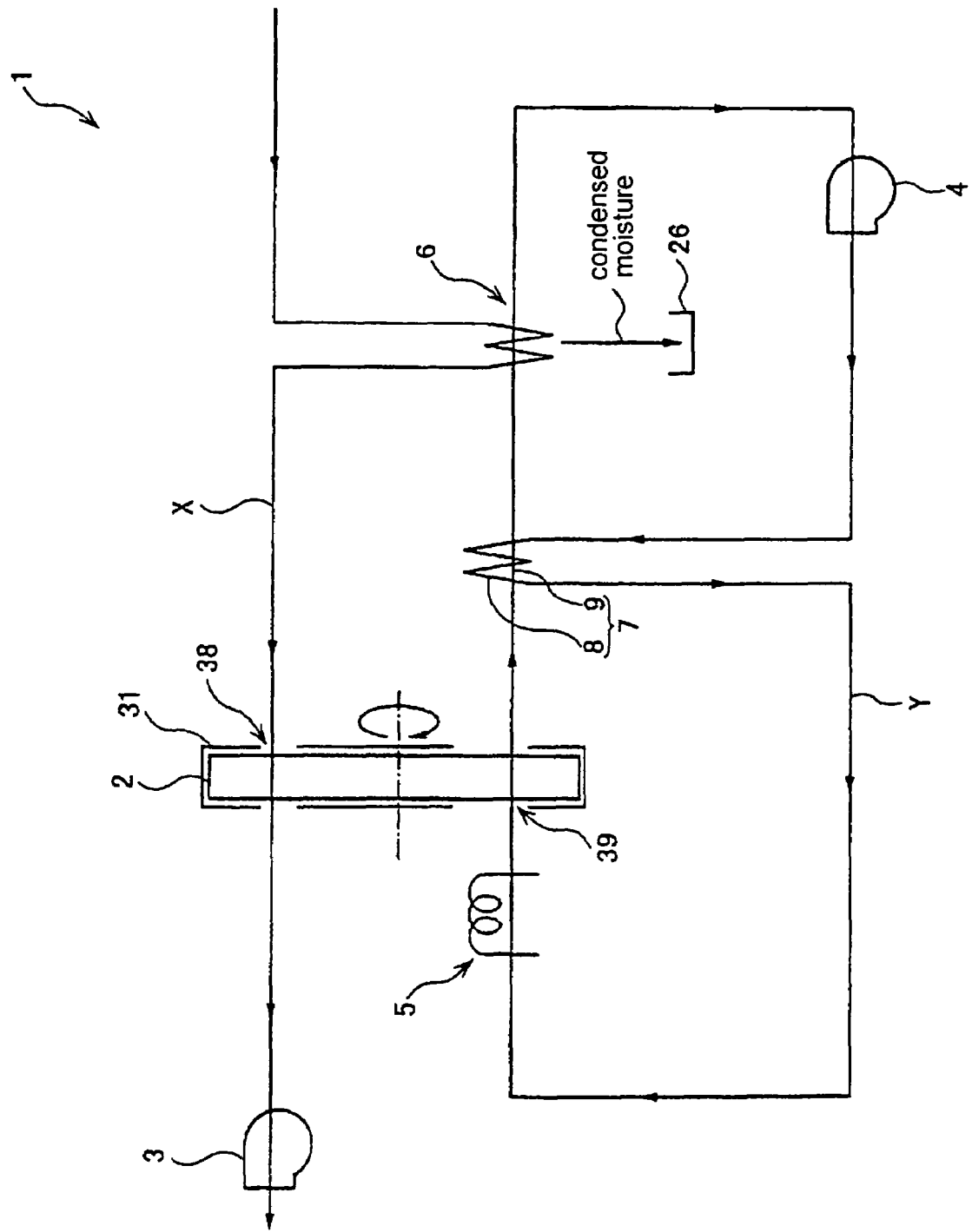
FIG. 6 is a drawing for explaining the dehumidification circuit of the dehumidifier according to the present invention and of the conventional dehumidifier.
Figure 7:
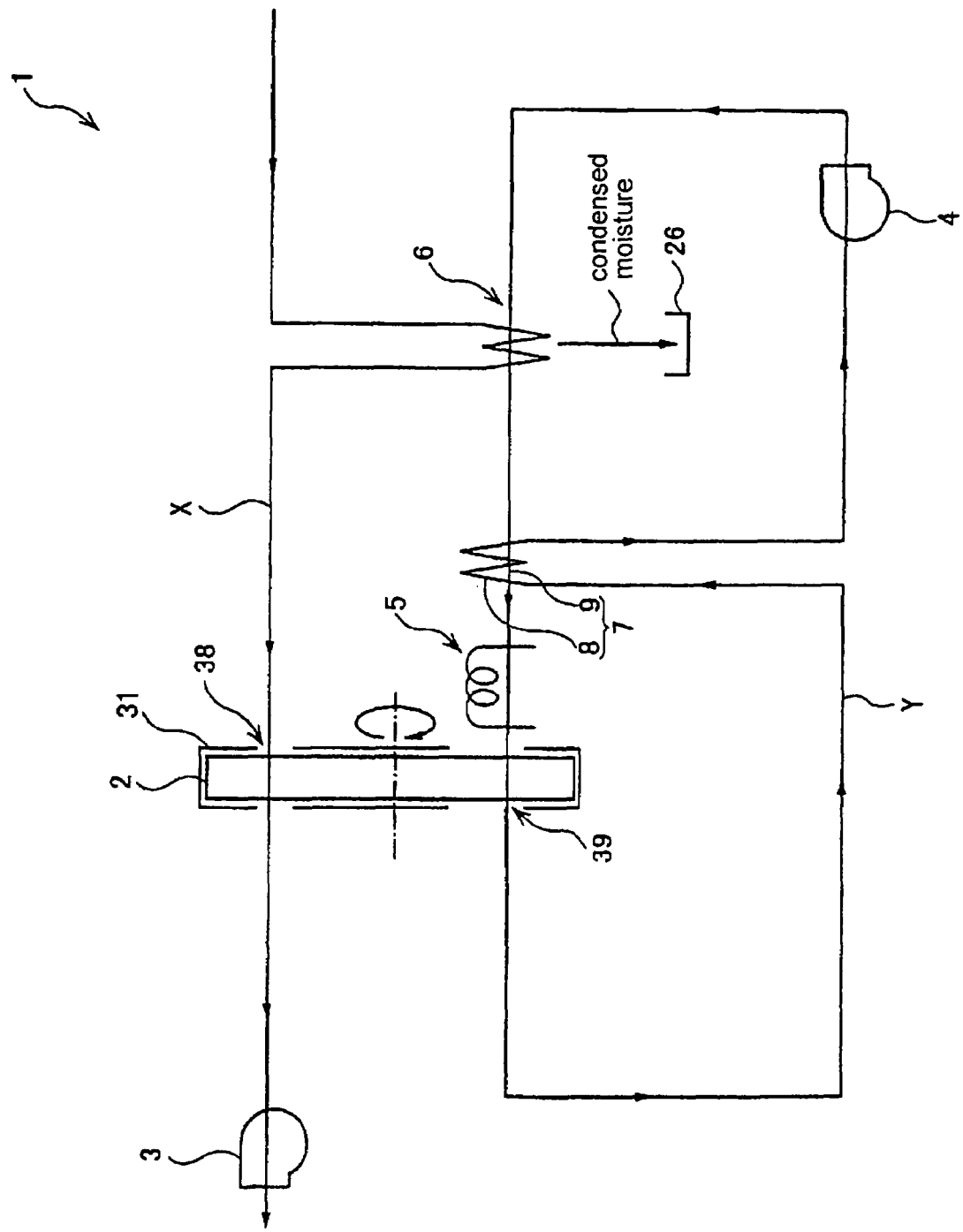
FIG. 7 is a drawing for explaining another dehumidification circuit of the dehumidifier according to the present invention and of the conventional dehumidifier.

As mentioned above, the dehumidifier according to the present invention is characterized in that the rate of heat recovery by the heat exchanger for recovering heat is increased by improving the constitution of the heat exchanger for recovering heat (since the main purpose of this heat exchanger is to heat the air for regeneration before the regeneration of the dehumidification rotor by recovering heat from the air for regeneration after regeneration of the dehumidification rotor, this heat exchanger is called "heat exchanger for recovering heat" for convenience. For short, this heat exchanger may also be called "first heat exchanger") and the direction of rotation of the dehumidification rotor, or by providing a flow guide plate which guides the air for regeneration after passing through the dehumidification rotor to prescribed positions in the heat exchanger for recovering heat so that the relatively hot air for regeneration which passed through the hot region in the dehumidification rotor is made to move in one of the passages in the heat exchanger for recovering heat for a long distance so as to subject the air to heat exchange for a relatively long time, and that the relatively cool air for regeneration which passed through the relatively cool region in the dehumidification rotor is made to move in one of the passages in the heat exchanger for recovering heat for a short distance so as to subject the air to heat exchange for a relatively short time, and the other structures may be the same as those of the conventional dehumidifier. Therefore, the dehumidification circuit of the dehumidifier according to the present invention may be the same as those of the known dehumidifiers as shown in FIGS. 6 and 7. However, the dehumidification circuit is not restricted to that shown in FIG. 6 or 7, but a number of modes having different arrangements of the heat exchanger and different number of heat exchanger are known (e.g., U.S. Pat. No. 6,083,304), and these dehumidification circuits may also be employed.

First, the characteristic portion of the present invention will be described based on FIG. 4. In the present specification and claims, unless otherwise specified or unless apparent from the context, the side from which the air to be dehumidified is inhaled into the dehumidification rotor is called "front", "front face", "frontward", "front side" or the like, the side from which the dehumidified air is discharged from the dehumidification rotor is called "rear", "rear face", "rearward", "rear side" or the like, and the side perpendicular to the front side and the rear side is called "lateral side face", "lateralward" or the like.

Figure 4:
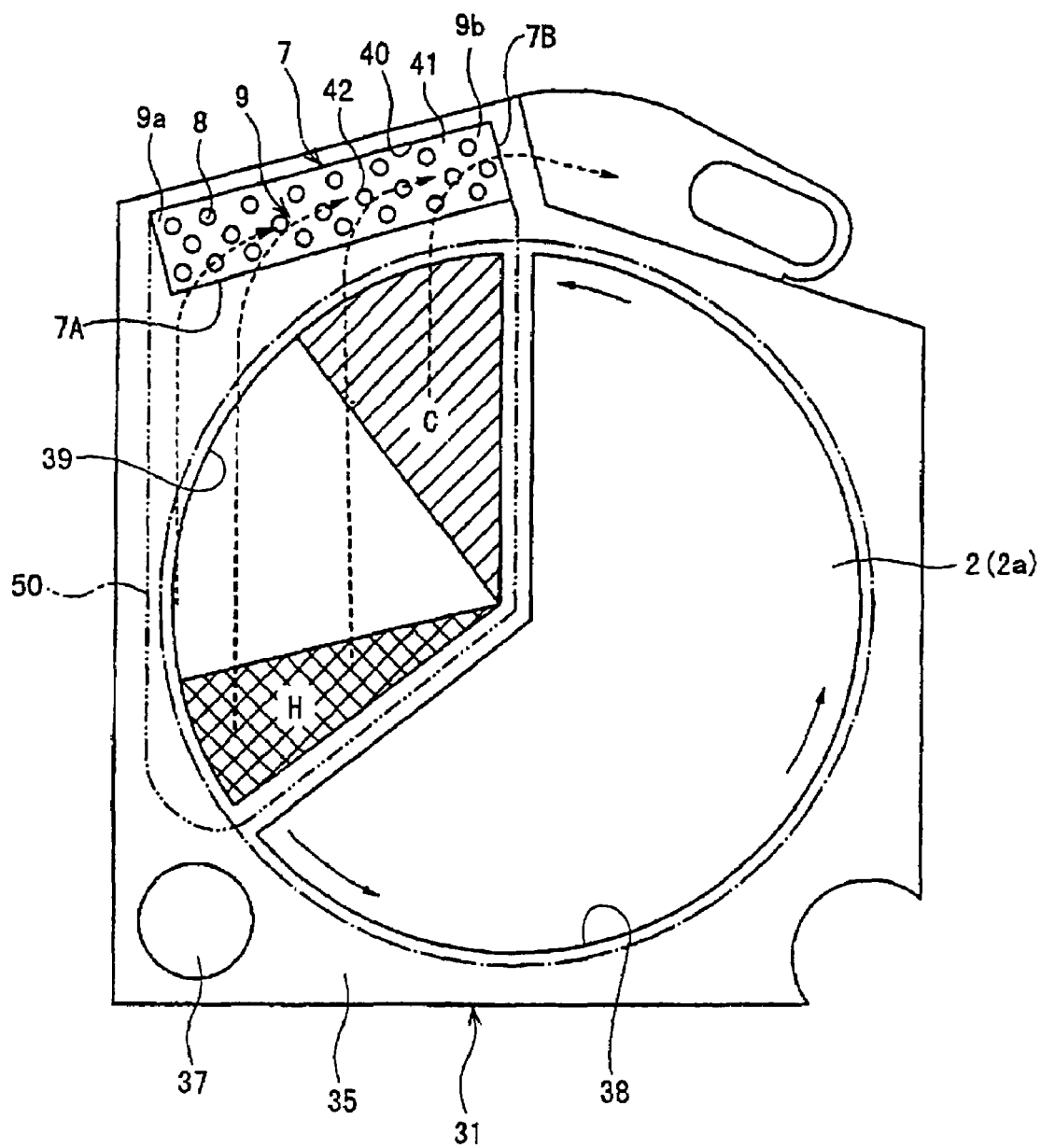
FIG. 4 is a schematic view of the rotor case of the dehumidifier shown in FIG. 1, viewed from the front side.

FIG. 4 is a schematic view of the rotor case of the dehumidifier (details will be described later) according to one embodiment of the present invention, when viewed from the front side. As shown in FIG. 4, the dehumidifier according to the present invention comprises a rotor case 31 harboring a disk-shaped dehumidification rotor 2 rotatably and drivably mounted therein, the rotor case 31 having an opening for dehumidification 38 through which air to be dehumidified passes, which opening 38 is so formed as to expose a region of the dehumidification rotor, the region being so defined as to have a prescribed central angle in the dehumidification rotor 2, and the rotor case 31 having an opening for regeneration 39 through which air for regeneration that regenerates the dehumidification rotor 2 passes, which opening for regeneration 39 is so formed as to expose a region of the dehumidification rotor 2, which second-mentioned region is so defined as to have a central angle and to be located in an area other than the first-mentioned region. The dehumidification rotor 2 is rotated as shown by the solid arrows.

A heat exchanger for recovering heat (first heat exchanger) 7 is separated into a first passage section 8 through which the air for regeneration before passing through the opening for regeneration 39 passes, and a second passage section 9 through which the air for regeneration after passing through the opening for regeneration 39 passes, which heat exchanger 7 has a separation wall section that transfers heat of the air for regeneration passing through the second passage section 9 to the air for regeneration passing through the first passage section 8. The perspective view of the first heat exchanger 7 is well depicted in FIG. 2. In the embodiment shown in the drawing, the first passage section 8 is composed of a plurality of pipes, and each cylindrical wall constituting each of the plurality of pipes corresponds to the "separation wall section" in this embodiment. The second passage section 9 is formed of the clearance among the above-mentioned plurality of pipes 8.

In the embodiment shown in the drawing, the first heat exchanger 7 is arranged at a position located outside of the dehumidification rotor 2, when viewed in radial direction of the dehumidification rotor 2; the separation wall section is formed such that the first passage section 8 extends from rear side to front side of the dehumidification rotor 2; and the second passage section 9 extends, in a prescribed length, along the outer periphery of the dehumidification rotor 2.

Since the dehumidification rotor 2 is slowly rotating in the direction shown by the solid arrows, the region denoted by "H" in FIG. 4, that is, the anterior area of the dehumidification rotor, which is located anterior in the direction of rotation, has dwelled in the opening for regeneration 39 for a longer time, so that the region has a higher temperature in the regeneration region. In contrast, the region denoted by "C" in FIG. 4, that is, the posterior area of the dehumidification rotor, which is located posterior in the direction of rotation, has dwelled in the opening for regeneration 39 for a shorter time, so that the region has a relatively low temperature in the regeneration region. Therefore, the temperature of the air for regeneration which passed through the anterior area H is higher than that of the air for regeneration which passed through the posterior area C.

In the embodiment shown in FIG. 4, the air for regeneration after passing through the regeneration region collides to a downstream cover member 50 (see FIG. 3), and then flows to the direction shown by broken arrows in FIG. 4. That is, the air for regeneration enters the second passage section 9 from the lateral side of the heat exchanger for recovering heat 7, which extends along the outer periphery of the dehumidification rotor 2, and is discharged from the second passage 9 after passing through the second passage section 9 along the outer periphery of the dehumidification rotor 2 for a prescribed distance.

As a result, as shown in FIG. 4, the hot air for regeneration which passed through the anterior area H passes through the second passage section 9 for a longer distance than the relatively cool air for regeneration which passed through the posterior area C. Therefore, more heat can be recovered from the hot air for regeneration, so that the rate of heat recovery is increased. Although some part of the relatively cool air for regeneration which passed through the posterior area C passes through the second passage section 9 for a longer distance than some part of the hot air for regeneration which passed through the anterior area H, as a whole, the hot air for regeneration which passed through the anterior area H passes through the second passage section 9 for a longer distance than the relatively cool air for regeneration which passed through the posterior area C, so that the rate of heat recovery by the first heat exchanger is increased by the above-described constitution. This has been experimentally confirmed (the experimental data will be shown later).

Figure 5:
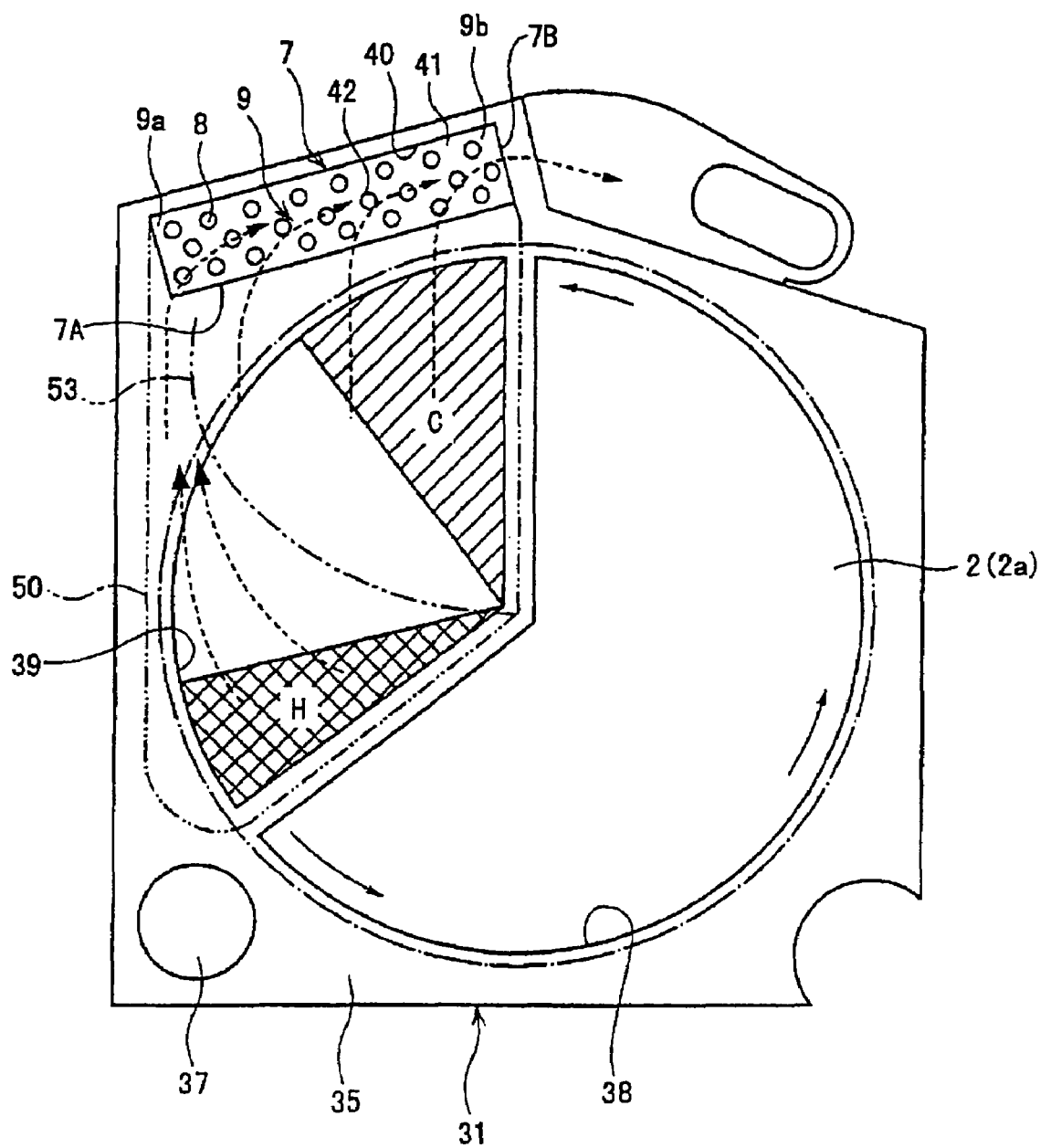
FIG. 5 is a schematic view of the rotor case of the dehumidifier, viewed from the front side, for explaining a second aspect of the present invention.

The characteristic portion of the second aspect of the present invention will now be described based on FIG. 5. The mode shown in FIG. 5 is similar to the mode shown in FIG. 4, so that description of the similar parts is omitted. In the mode shown in FIG. 5, a flow guide plate 53 (shown by two-dot chain line in FIG. 5) is provided in a downstream cover member 50 (see FIG. 3) arranged at a rear portion of the rotor case 31. That is, a flow guide plate 53 which guides the air for regeneration that passed through the posterior area C to downstream portion in the second passage section 9, and which guides the air for regeneration that passed through the anterior area H to upstream portion in the second passage section 9, is provided. As a result, the air for regeneration which passed through the dehumidification rotor 2 is flown in the direction shown by the broken arrows. That is, the entire amount of the air for regeneration after passing through the posterior area C is guided to downstream portion in the second passage 9, and the entire amount of the air for regeneration after passing through the anterior area H is guided to upstream portion in the second passage 9. Therefore, with this mode, the rate of heat recovery by the first heat exchanger is more promoted than by the mode shown in FIG. 4.

A preferred embodiment of the present invention will now be described based on the drawings. The circuit of the preferred embodiment which will now be described is shown in FIG. 7.

Figure 1:
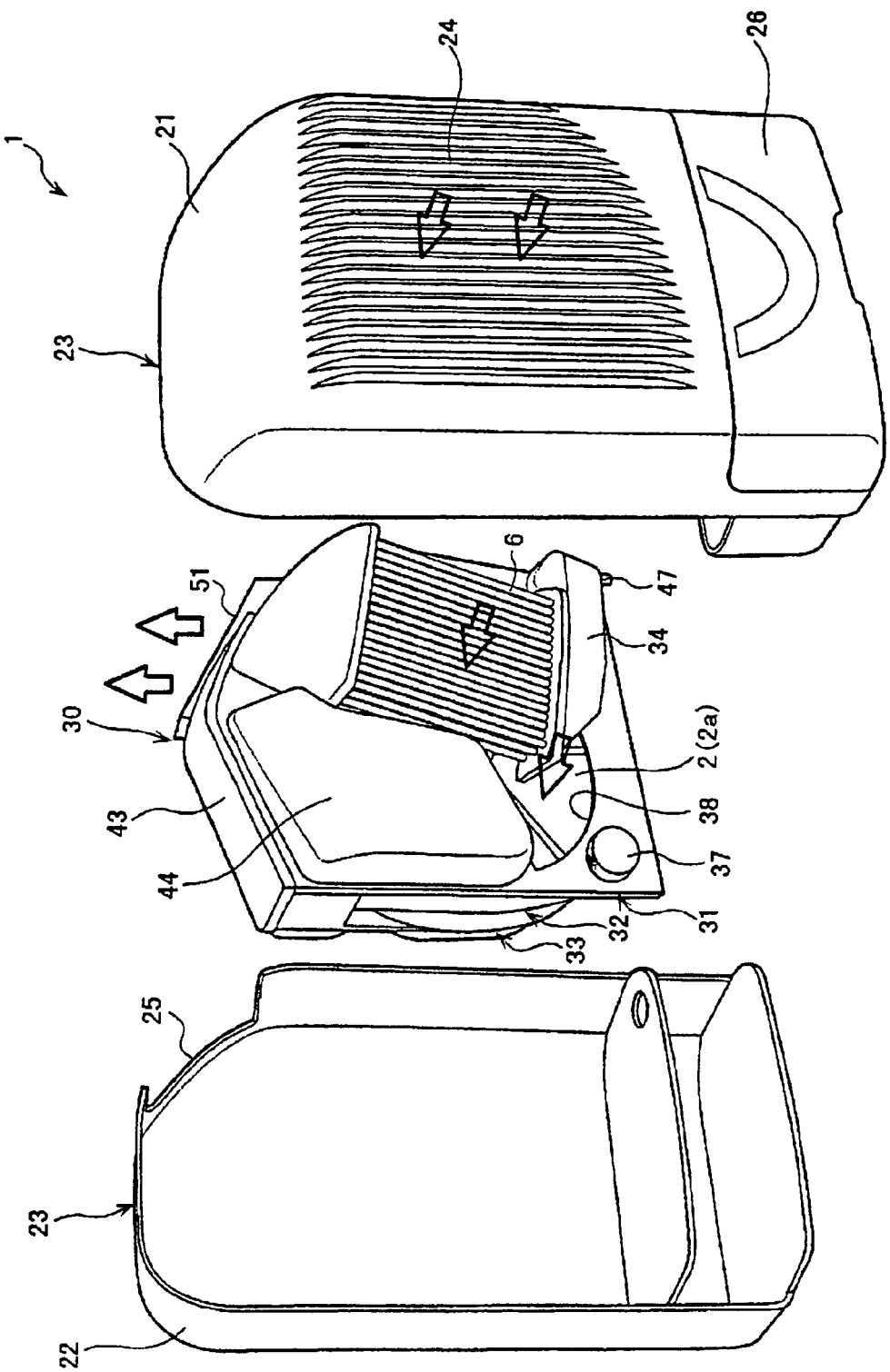
FIG. 1 is an exploded perspective view for explaining an embodiment of the dehumidifier according to the present invention.
Figure 2:
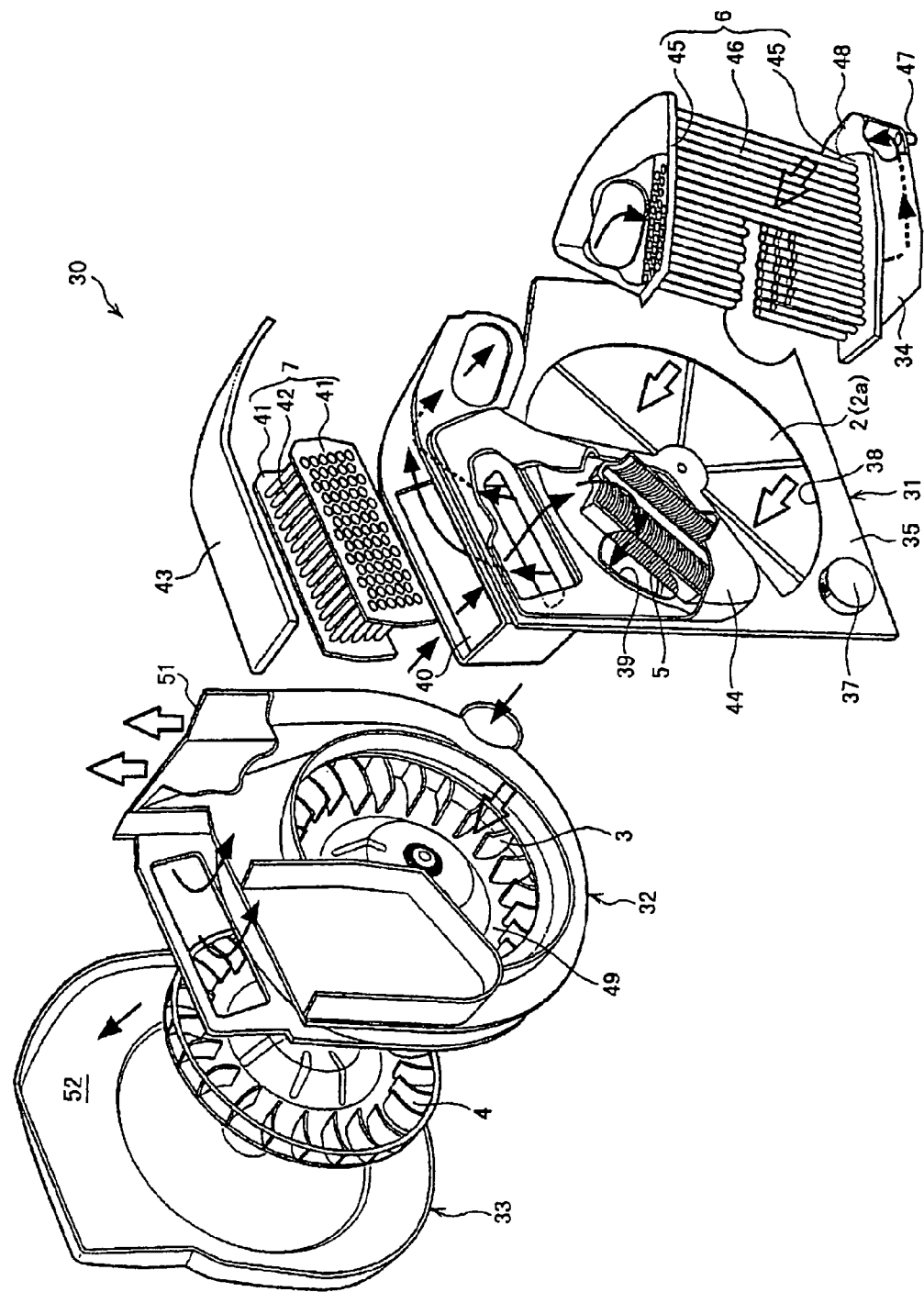
FIG. 2 is an exploded perspective view of the main body of the dehumidifier shown in FIG. 1.
Figure 3:
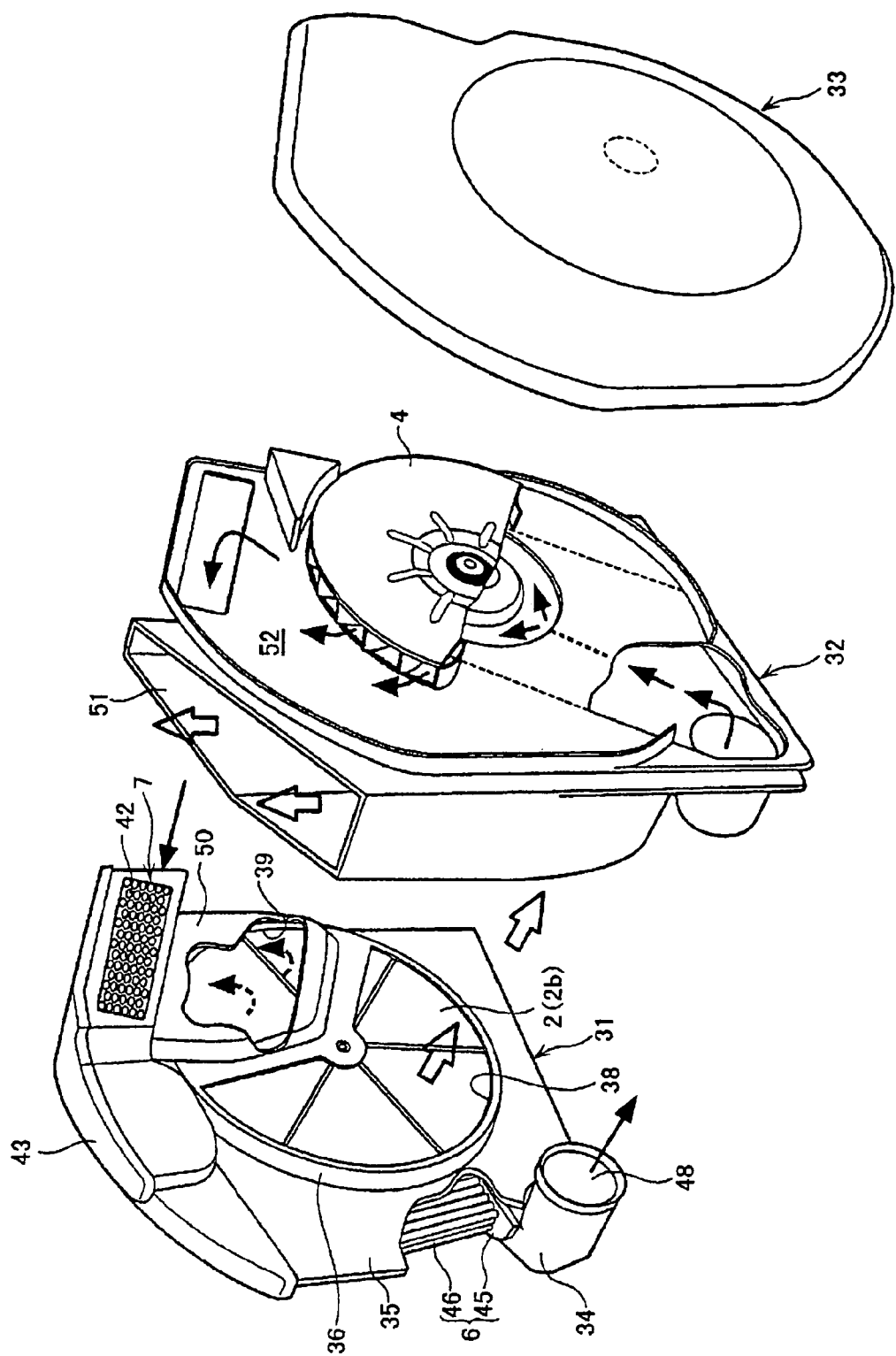
FIG. 3 is an exploded perspective view of the main body of the dehumidifier shown in FIG. 1, viewed from the rear side.

FIG. 1 is an exploded perspective view for explaining the dehumidifier according to the present invention; FIG. 2 is an exploded perspective view of the main body of the dehumidifier; FIG. 3 is an exploded perspective view of the main body of the dehumidifier viewed from the rear side; and FIG. 4 is a schematic view of the rotor case 31 viewed from the front side. The constituent elements similar to those of the conventional dehumidifier are denoted by the same reference number and detailed description thereof is omitted.

A dehumidifier 1 has a longitudinally elongated and laterally wide housing 23 comprising a front cover 21 and a rear cover 22. A main body 30 of the dehumidifier is harbored in the housing 23. In the front face of the housing 23, inlets 24 for inhaling the outside air into the dehumidifier 1 are opened. In the upper side of the housing, an air outlet 25 for discharging the air dehumidified in the dehumidifier 1 is opened. A reservoir tank 26 is harbored at a lower part of the housing 23, which is removable by drawing the tank 26 frontwardly.

The housing 23 harbors a main body 30 of the dehumidifier, which comprises a rotor case 31, a fan casing 32, a dehumidification rotor 2, a dehumidification fan 3, a regeneration fan 4, a heat exchanger for cooling 6, a heat exchanger for recovering heat 7 and a drain pan 34.

The rotor case 31 comprises a planar section 35 arranged to face the front cover 21, and a rotor-harboring section 36 located at the rear side of the planar section 35, which harbors the dehumidification rotor 2 rotatably. The dehumidification rotor 2 comprises a honeycomb material through which air can pass along the rotation axis, in which a moisture-adsorbing agent such as zeolite, silica gel, lithium chloride, calcium chloride or the like is retained on the surface or inner side thereof, which honeycomb material is placed in a ring-shaped frame. The dehumidification rotor 2 is shaped into the form of a disk, and its center of rotation is supported by a rotor case 31. The dehumidification rotor 2 is connected to a rotor motor 37 through a reducer which is not shown, and is driven to rotate in the anticlockwise direction when viewed from the front side at a prescribed rotation speed (for example, at a rotation speed of about one revolution per about 3 minutes. The rotation speed is not restricted thereto, and is usually about 1/10 to 1 revolution per minute) (see FIG. 4).

In the rotor case 31, an opening for dehumidification 38 through which the air to be dehumidified passes, and an opening for regeneration 39 through which the air for regeneration passes are formed. The opening for dehumidification 38 and the opening for regeneration 39 penetrate the rotor case 31 in the front and rear direction so that a part of the front face 2a and a part of the rear face 2b of the dehumidification rotor 2 are exposed from the openings. The opening for dehumidification 38 is opened such that it exposes the region so defined as to have a prescribed central angle in the dehumidification rotor 2 (in the present mode, about 2/3 range of the rotating region of the rotor). The opening for regeneration 39 exposes the region (in the present mode, about 1/3 range of the rotating region of the rotor) so defined as to have a central angle and to be located in an area other than the above-mentioned region exposed by the opening for dehumidification 38, such that it is arranged adjacent to the opening for dehumidification 38 in the direction of rotation of the dehumidification rotor 2.

In the upper portion of the rotor case 31, a chamber 40 for harboring the heat exchanger for recovering heat 7 is provided. The heat exchanger for recovering heat 7 is constituted by retaining a plurality of parallel pipes (separation wall section) penetrating a pair of supporting walls 41 facing each other. The chamber 40 for harboring the heat exchanger for recovering heat is separated by the pipes 42 of the heat exchanger for recovering heat 7 into a first passage section 8 (in the pipes 42) through which the air for regeneration before passing through the opening for regeneration 39 passes and a second passage section 9 (between the pipes 42) through which the air for regeneration after passing through the opening for regeneration 39 passes so that the heat of the air for regeneration passing through the second passage section 9 is transferred to the air for regeneration passing through the first passage section 8. In the drawings, the reference numeral 43 denotes a cover which closes the upper portion of the chamber 40 for harboring the heat exchanger for recovering heat, so as to form a communication passage communicating the second passage section 9 and a heat exchanger for cooling 6 later described.

In front of the rotor case 31, a heater 5 and a heat exchanger for cooling 6 are mounted. The heater 5 is for heating the air for regeneration before passing through the opening for regeneration 39, and is heated by supplying electricity.

In the drawing, reference numeral 44 denotes an upper cover member. The upper cover member 44 separates the opening for dehumidification 38 and the opening for regeneration 39 at the front side of the rotor case 31, and communicates the first passage section 8 in the chamber 40 for harboring the heat exchanger for recovering heat and the upstream of the opening for regeneration 39, and harbors the heater 5 therein.

The heat exchanger for cooling 6 is constituted by retaining a plurality of parallel pipes (separation wall section) penetrating a pair of supporting walls 45 facing each other. In front of the opening for dehumidification 38, the pipes 46 extends in the up and down direction, and the heat exchanger for cooling 6 is arranged at a position through which the air to be dehumidified before passing through the opening for dehumidification 38 passes. The upper part of the heat exchanger for cooling 6 is communicated to the second passage section 9 of the chamber 40 for harboring the heat exchanger for recovering heat through a communication passage.

This heat exchanger for cooling 6 is mounted on the rotor case 31 such that the pipes 46 are held at a somewhat inclined position from the vertical direction (in this mode, inclination angle of about 15°), so that the surface tension of the condensed water formed in the pipes 46 is made unbalanced, thereby preventing the condensed water from dwelling in the pipes 46.

Under the heat exchanger for cooling 6, a drain pan 34 for collecting the condensed water which is condensed in the pipes 46 and drops. The drain pan 34 has a drain hole 47 for introducing the water accumulated in the drain pan 34 to the reservoir tank 26, and a duct 48 for supplying the air flown into the drain pan to the regeneration fan 4 again. The drain hole 47 has means for collecting the condensed water in the reservoir tank 26 without allowing air flow.

In rear of the rotor case 31, a downstream cover member 50 and a fan casing 32 are mounted. The downstream cover member 50 separates the opening for dehumidification 38 and the opening for regeneration 39 at the rear side of the rotor case 31, and communicates the downstream side of the opening for regeneration 39 and the second passage section 9 of the chamber 40 for harboring the heat exchanger for recovering heat.

The fan casing 32 has a structure to form a chamber 49 for harboring the dehumidification fan cooperatively with the rotor case 31 by being mounted on the rear side of the rotor case 31. In the chamber 49 for harboring the dehumidification fan, a dehumidification fan 3 is rotatably and drivably mounted.

At the upper part of the chamber 49 for harboring the dehumidification fan, an outlet 51 for discharging the air in the chamber 49 to the outside is opened, which is communicated to the air outlet 25 of the housing 23.

Thus, as indicated by the hollow and thick arrows in the drawings, by the rotation of the driven dehumidification fan 3, the air to be dehumidified is inhaled from outside into the housing 23 through the inlets 24, which is then made to pass through the space between the pipes 46 in the heat exchanger for cooling 6, and is then made to pass through the opening for dehumidification 38 so as to adsorb the moisture to the dehumidification rotor 2. The dehumidified air is then made to flow into the chamber 49 for harboring the dehumidification fan and is discharged to the outside of the housing 23 through the outlet 51 on the upper part of the chamber 49 and the air outlet 25. By the above-mentioned route, the dehumidification passage X (see FIG. 6) is constituted.

In rear of the fan casing 32, a chamber 52 for harboring the regeneration fan is cooperatively formed by the fan casing 32 and a fan cover 33, and the regeneration fan 4 is rotatably and drivably mounted in the chamber 52. The dehumidification fan 3 and the regeneration fan 4 are coaxially connected each other at the front and rear side of the fan casing 32, respectively, and are rotatably and drivably mounted by a fan motor (not shown).

The U-shaped part located at the upper portion of the fan casing 32 is for heat insulation by covering the downstream cover member 50, and is not the downstream cover member 50.

The upper portion of the chamber 52 for harboring the regeneration fan is connected to the chamber 40 for harboring the heat exchanger for recovering heat such that the air for regeneration flown by the regeneration fan 4 passes through the first passage section 8 and enters the upstream cover member 44. In the lower portion of the chamber 52 for harboring the regeneration fan, the end of the duct 48 of the drain pan 34 opens so as to communicate the chamber 52 and the drain pan 34 (see FIG. 3).

Thus, as shown by the thick arrows in the drawing, by the rotation of the driven regeneration fan 4, the air for regeneration in the chamber 52 for harboring the regeneration fan is sent to the upper part of the chamber 52, then passes through the first passage section 8 of the chamber 40 for harboring the heat exchanger for recovering heat to move from the rear side to the front side of the rotor case 31, and enters the inner side of the upstream cover member 44.

The air for regeneration then passes through the opening for regeneration 39 after being heated by the heater 5 in the upstream cover member 44 to move from the front side 2a to the rear side 2b of the dehumidification rotor 2, then raises in the downstream cover member 50 to enter the heat exchanger for recovering heat 7 from the lower face of the chamber 40 for harboring the heat exchanger for recovering heat, then passes through the second passage section 9 (between pipes 42) in the chamber 40 along the longitudinal direction of the heat exchanger for recovering heat 7 along the outer periphery of the dehumidification rotor 2, and is then discharged from the downstream portion 9b in the second passage section 9.

The air for regeneration then enters the heat exchanger for cooling 6, cooled by the air to be dehumidified passing through the space between the pipes 46 from the front side to the rear side, and then returns to the chamber 52 for harboring the regeneration fan after passing through the duct 48. By the above-described closed circuit, the regeneration passage Y (see FIG. 6) is constituted.

According to the dehumidifier 1 having the above-described constitution, by the start of the operation of the dehumidifier 1, the air for regeneration after passing through the opening for regeneration 39 enters the second passage section 9 from the lateral side 7A of the heat exchanger for recovering heat 7, which extends along the dehumidification rotor 2, flows in the second passage section 9 along the outer periphery of the dehumidification rotor 2, and flows out from the end portion 7B which is one of the ends of the heat exchanger for recovering heat 7 when viewed longitudinally.

The direction of rotation of the dehumidification rotor 2 is set such that it is rotated in the direction (anticlockwise in the drawings) opposite to the direction of flow of the air for regeneration flowing in the second passage section 9. Therefore, the air for regeneration which passed through the anterior area H located anterior in the direction of rotation of the dehumidification rotor 2 in the opening for regeneration 39 enters the upstream portion 9a of the second passage section 9 from the lateral side 7A, moves along the longitudinal direction of the heat exchanger for recovering heat 7 in the second passage section 9 along the outer periphery of the dehumidification rotor 2 and then flows out from the downstream portion 9b in the second passage section 9. On the other hand, the air for regeneration which passed through the posterior area C located posterior in the direction of rotation of the dehumidification rotor 2 enters the downstream portion 9b in the second passage section 9 from the lateral side 7A, and passes through the second passage section 9 for a short time.

Since the anterior area H located anterior in the direction of rotation of the dehumidification rotor has dwelled in the opening for regeneration 39 for a longer time than the posterior area C located posterior in the direction of rotation of the dehumidification rotor, the anterior area H has been exposed to the heated air for regeneration for a longer time, so that it is hotter than the posterior area C. Further, since the water content therein has become smaller, the amount of the moisture evaporated by the heat from the heater 5 is smaller, so that less heat of vaporization is taken. Therefore, the temperature of the air for regeneration which passed through the anterior area H is higher than the air for regeneration which passed through the posterior area C.

Thus, the hot air for regeneration can be made to pass through the second passage section 9 for a long distance from the upstream portion 9a to the downstream portion 9b, and the cool air for regeneration can be made to enter the second passage section 9 from the downstream portion 9b and can be discharged therefrom in a short time. By this, the heat of the hotter air can be transferred to the air for regeneration passing through the first passage section 8, that is, the air for regeneration before passing the heater 5, so that the temperature of the air for regeneration can be raised.

As a result, the rate of recovery of heat by the heat exchanger for recovering heat 7 can be increased, and the heating capacity of the heater 5 may be made smaller.

Therefore, the amount of dehumidification per a power consumption can be increased and the dehumidification ability of the dehumidifier 1 can be promoted.

(Second Mode)

FIG. 5 is a schematic view of the rotor case of the dehumidifier, viewed from the front side, for explaining a second mode of the present invention. The constituent elements similar to those in the first mode are denoted by the same reference number and detailed description thereof is omitted. The characteristic feature of this mode is that a flow guide plate 53 for positively guiding the air for regeneration which passed through the anterior area H located anterior in the direction of rotation of the dehumidification rotor to the upper portion 9a of the second passage section 9, which flow guide plate 53 is arranged in the downstream cover member 50 in the regeneration passage Y.

As shown in FIG. 5, the flow guide plate 53 extends from the vicinity of the center of rotation of the dehumidification rotor 2 to the outer periphery of the dehumidification rotor 2, and further extends to the vicinity of the upstream portion 9a of the second passage section 9, thereby separating the downstream cover member 50 into the region covering the anterior area H and the region covering the other area including the posterior area C.

Therefore, the air for regeneration which passed through the anterior area H alone may be positively guided to the upstream portion 9a in the second passage 9, so as to surely make it enter the upstream portion 9a, thereby preventing the air for regeneration which passed through the anterior area H from being mixed with the air for regeneration which passed through an area other than the anterior area H and so from being cooled.

In this mode, since the direction of rotation of the dehumidification rotor 2 and the direction of the flow of the air for regeneration flowing in the second passage section 9 are counter (opposite), the air for regeneration which passed through the anterior area H can be made to enter the upstream portion 9a by merely separating the inner space of the downstream cover member 50 into two chambers. Thus, the structures of the downstream cover member 50 and of the flow guide plate 53 can be made simple, so that the mode may easily be practiced.

Although in the above-described second mode, an example wherein the second passage section 9 of the heat exchanger for recovering heat 7 is shorter (smaller) than the opening for dehumidification 38 was described, the flow guide plate 53 may also be used in cases where the opening for dehumidification 38 and the heat exchanger for recovering heat 7 are long (big).

For example, although not shown, with a dehumidifier 1 according to another embodiment wherein the prescribed central angle of the opening for regeneration 39 is 180°, and the heat exchanger for recovering heat 7 is so arranged as to cover a half of the outer periphery thereof like a half donut, the volume of the passage from the opening for regeneration 39 to the chamber 40 for harboring the heat exchanger for recovering heat via the downstream cover member 50 is large.

With such a constitution, by providing a flow guide plate 53 in the regeneration passage Y, the air for regeneration which passed through the anterior area H can be made to enter the upstream portion 9a without being mixed with the air for regeneration which passed through the posterior area C.

The present invention is not restricted to the above-described modes, and various modifications may be made without departing from the spirit of the present invention. For example, in the modes described above, dehumidifier 1 in which the dehumidification rotor 2 is held vertically was described, the present invention may be applied to a dehumidifier in which the dehumidification rotor 2 is held horizontally.

Figure 8:
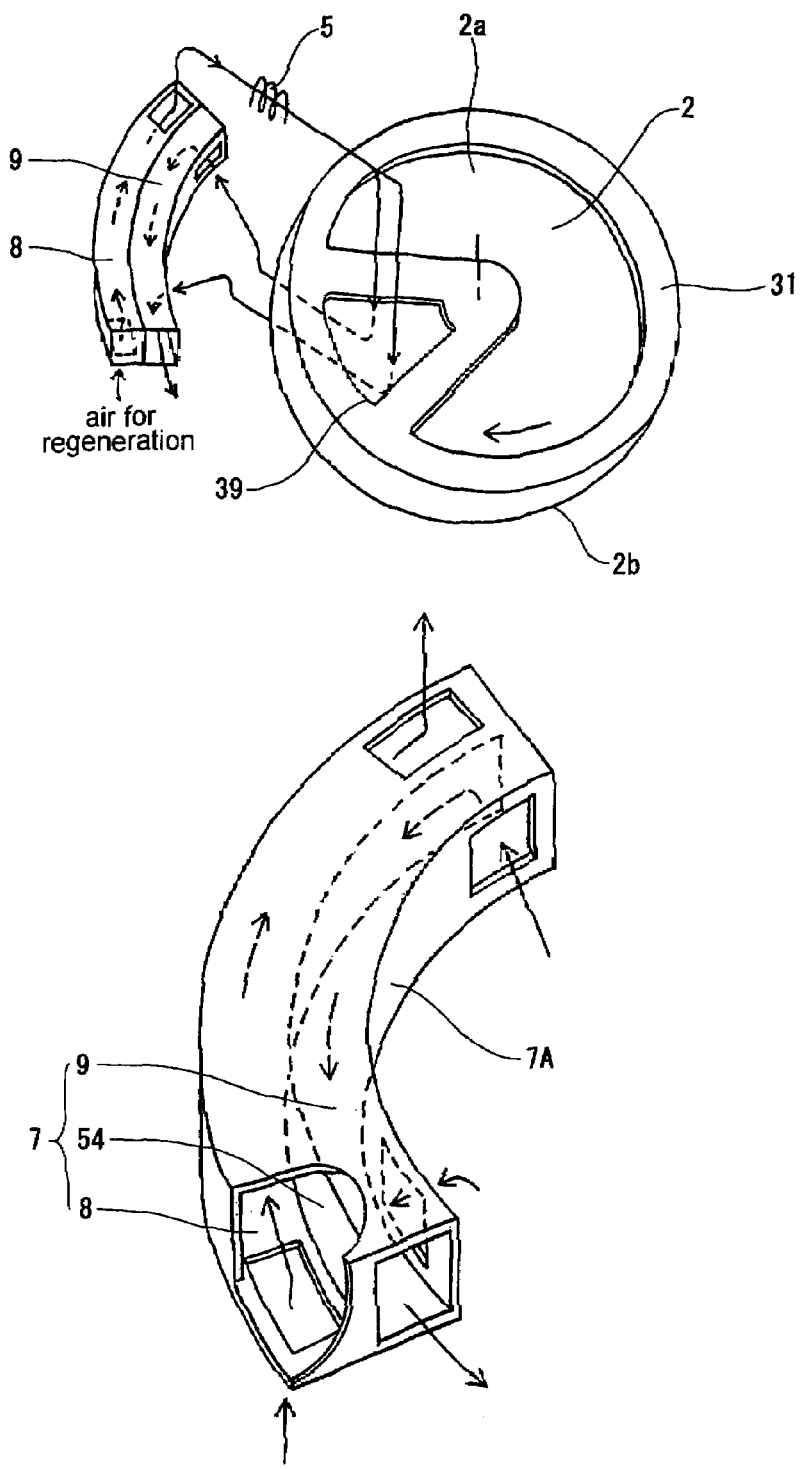
FIG. 8 is a schematic view of the dehumidification rotor and the heat exchanger for recovering heat of a modification of the dehumidifier shown in FIG. 1.

Further, although in the above-described first and second modes, the heat exchanger for recovering heat 7 in which the first passage section 8 and the second passage section 9 are separated such that they cross perpendicularly, a heat exchanger for recovering heat 7 in which the first passage section 8 and the second passage section 9 extend in parallel along the outer periphery of the dehumidification rotor 2 for a prescribed distance may be used, and the air for regeneration n the first passage section 8 and the air for regeneration in the second passage section 9 flow in counter directions. An example of this mode is schematically shown in FIG. 8. The lower drawing in FIG. 8 is an enlarged view of a part of the heat exchanger for recovering heat 7 shown in the upper drawing.

According to this, the regeneration passage Y is constituted such that the air for regeneration passes through the first passage section 8 along the outer periphery of the dehumidification rotor 2 for a prescribed distance to move from the rear side 2b of the dehumidification rotor 2 to the front side 2a, then passes through the opening for regeneration 39 after being heated by the heater 5 to move to the rear side 2b of the dehumidification rotor 2 from the front side 2a, then enters the second passage section 9 of the heat exchanger for recovering heat 7 from the lateral side 7A, and then flows out from the second passage section 9 after passing through the second passage 9 for a prescribed distance along the outer periphery of the dehumidification rotor 2.

Thus, the distances of the first passage section 8 and of the second passage section 9 may be made long, so that the rate of heat recovery by the heat exchanger for recovering heat 7 may be further promoted. Further, since the air for regeneration in the first passage section 8 and the air for regeneration in the second passage section 9 flow in counter directions, the heat of the air for regeneration in the second passage section 9 can be transferred to the air for regeneration in the first passage section 8 with a high efficiency, so that the rate of heat recovery may be further promoted.

In FIG. 8, although the first passage section and the second passage section are depicted as a single passage, respectively, the first passage section may be constituted by a plurality of pipes and the second passage section may be constituted by the space between the plurality of pipes as in the embodiments shown in FIGS. 1 to 5.

Further, in FIG. 8, although the lateral side 7A of the heat exchanger for recovering heat 7 has two openings, and the hot air which passed through the anterior area H is flown to the opening at upstream side, and the cool air which passed through the posterior area C is flown to the opening at downstream side, these two openings may be continuous as in the embodiment shown in FIG. 2. Since the second passage section 9 extends along the dehumidification rotor 2, if the opening for regeneration 39 and the lateral side 7A of the heat exchanger for recovering heat 7 are close, the hot air which passed through the anterior area H flows into the upstream opening and the cool air which passed through the posterior area C flows into the downstream opening. If the opening for regeneration 39 and the lateral side 7A of the heat exchanger for recovering heat 7 are apart from each other so that the hot air and the cool air are mixed, a flow guide plate 53 may be provided as in the embodiment shown in FIG. 5.

According to the dehumidifier of the present invention, since the direction of rotation of the dehumidification rotor is set such that the air for regeneration which passed through posterior area of the dehumidification rotor flows into downstream portion in the second passage section, which posterior area is located posterior in the direction of rotation, and that the air for regeneration which passed through anterior area of the dehumidification rotor flows into upstream portion in the second passage section, which anterior area is located anterior in the direction of rotation, the hot air for regeneration which passed through the hot and dry anterior area that dwells in the opening for regeneration for a longer time than the posterior area can be made to flow into the upstream portion of the first passage section, and the cool air for regeneration which passed through the posterior area can be made to flow into the downstream portion of the second passage section.

Therefore, the hot air for regeneration can be made to pass through the second passage section for a long distance from the upstream portion to the downstream portion thereof, and the cool air for regeneration which passed through the posterior area can be made to flow into the downstream portion so that it passes through the second passage section for a short time. Therefore, the rate of heat recovery by the heat exchanger for recovering heat can be increased, and the amount of dehumidification per a power consumption by the heater can be increased, thereby promoting the dehumidification ability of the dehumidifier.

Further, according to the other invention, since the air for regeneration which passed through the anterior area located anterior in the direction of rotation of the dehumidification rotor is guided to the upstream portion of the second passage section, and the air for regeneration which passed through the posterior area located posterior in the direction of rotation of the dehumidification rotor is guided to the downstream portion of the second passage section, the hot air for regeneration can be made to pass through the second passage section for a long distance from the upstream portion to the downstream portion thereof, and the cool air for regeneration which passed through the posterior area can be made to flow into the downstream portion so that it passes through the second passage section for a short time. Therefore, the rate of heat recovery by the heat exchanger for recovering heat can be increased, and the amount of dehumidification per a power consumption by the heater can be increased, thereby promoting the dehumidification ability of the dehumidifier.

To prove this, the dehumidifier shown in FIGS. 1 to 4 was prepared, and the amounts of dehumidification when the direction of rotation of the rotor was anticlockwise (example of the present invention) and when the direction of rotation of the rotor was clockwise (comparative example) were measured. The diameter of the dehumidification rotor was 25 cm, the thickness thereof was 1.3 cm, and the rotation speed of the dehumidification rotor was ⅓ revolution per minute.

The results are shown in Table 1 below.

TABLE 1

| Direction of Rotation | Dehumidification Amount (g/h) | Heater Power (Wh) | Dehumidification Efficiency (g/Wh) |
| --- | --- | --- | --- |
| Anticlockwise (the invention) | 295.0 | 437.5 | 0.674 |
| Clockwise (comparative example) | 261.2 | 436.5 | 0.598 |

Atmosphere of Experiment: 25° C., 60% RH; Flow rate of air to be dehumidified: 330 m$^3$/h; Flow rate of air for regeneration: 20 m$^3$/h As shown in Table 1, the dehumidification efficiency of the example of the present invention was higher than that of the comparative example by 13%. Thus, it was confirmed that the dehumidification efficiency is promoted by the present invention.

The invention claimed is:

1. A dehumidifier comprising:
a rotor case harboring a disk-shaped dehumidification rotor rotatably and drivably mounted therein, said rotor case having an opening for dehumidification through which air to be dehumidified passes, which opening is so formed as to expose a region of said dehumidification rotor, said region being so defined as to have a prescribed central angle in said dehumidification rotor, and said rotor case having an opening for regeneration through which air for regeneration that regenerates said dehumidification rotor passes, which opening for regeneration is so formed as to expose a region of said dehumidification rotor, which second-mentioned region is so defined as to have a central angle and to be located in an area other than said first-mentioned region;
a heater for heating the air for regeneration before passing through said opening for regeneration;
a heat exchanger for recovering heat, which is separated into a first passage section through which the air for regeneration before passing through said opening for regeneration passes, and a second passage section through which the air for regeneration after passing through said opening for regeneration passes, which heat exchanger has a separation wall section that transfers heat of said air for regeneration passing through said second passage section to said air for regeneration passing through said first passage section;
a dehumidification passage harboring a dehumidification fan that inhales said air to be dehumidified from outside and discharges the air after passing through said opening for dehumidification; and
a regeneration passage harboring a regeneration fan which flows said air for regeneration through said first passage section, said heater, said opening for regeneration and said second passage section, in the order mentioned;
wherein the direction of rotation of said dehumidification rotor is set such that the air for regeneration which passed through posterior area of said dehumidification rotor flows into downstream portion in said second passage section, which posterior area is located posterior in the direction of rotation, and that the air for regeneration which passed through anterior area of said dehumidification rotor flows into upstream portion in said second passage section, which anterior area is located anterior in the direction of rotation.

2. The dehumidifier according to claim 1, wherein said heat exchanger for recovering heat is arranged at a position located outside of said dehumidification rotor, when viewed in radial direction of said dehumidification rotor; said separation wall section is formed such that said first passage section extends from rear side to front side of said dehumidification rotor, and that said second passage section extends, in a prescribed length, along the outer periphery of said dehumidification rotor; said passage for regeneration is constituted such that said air for regeneration passes through said first passage section to move from the rear side to front side of said dehumidification rotor, then passes through said opening for regeneration to move from the front side to the rear side of said dehumidification rotor after passing said heater, then flows to said heat exchanger for recovering heat, then flows into said second passage section from the lateral side of said heat exchanger for recovering heat, extending along said dehumidification rotor, and then flows out of said second passage section after passing through said second passage section in a prescribed distance along the outer periphery of said dehumidification rotor; and wherein the direction of rotation of said dehumidification rotor is set opposite to the direction of flowing of said air for regeneration flowing in said second passage section.

3. The dehumidifier according to claim 1, wherein said heat exchanger for recovering heat is arranged at a position located outside of said dehumidification rotor, when viewed in radial direction of said dehumidification rotor; said separation wall section is formed such that said first passage section extends from rear side to front side of said dehumidification rotor, and that said second passage section extends, in a prescribed length, along the outer periphery of said dehumidification rotor; said passage for regeneration is constituted such that said air for regeneration passes through said first passage section to move from the rear side to front side of said dehumidification rotor, then passes through said opening for regeneration to move from the front side to the rear side of said dehumidification rotor after passing said heater, then flows to said heat exchanger for recovering heat, then flows into said second passage section from the lateral side of said heat exchanger for recovering heat, extending along said dehumidification rotor, and then flows out of said second passage section after passing through said second passage section in a prescribed distance along the outer periphery of said dehumidification rotor;

the direction of rotation of said dehumidification rotor is set opposite to the direction of flowing of said air for regeneration flowing in said second passage section; and wherein said dehumidifier is constituted such that said air for regeneration in said first passage section flows in the direction opposite to the direction of flowing of said air for regeneration in said second passage section.

4. The dehumidifier according to any one of claims 1 to 3, further comprising a flow guide plate which guides said air for regeneration that passed through said anterior area of said dehumidification rotor to upstream portion in said second passage section, and which guides said air for regeneration that passed through said posterior area of said dehumidification rotor to downstream portion in said second passage section, which flow guide plate is arranged in said passage for regeneration at a position downstream of said opening for regeneration.

5. A dehumidifier comprising:
a rotor case harboring a disk-shaped dehumidification rotor rotatably and drivably mounted therein, said rotor case having an opening for dehumidification through which air to be dehumidified passes, which opening is so formed as to expose a region of said dehumidification rotor, said region being so defined as to have a prescribed central angle in said dehumidification rotor, and said rotor case having an opening for regeneration through which air for regeneration that regenerates said dehumidification rotor passes, which opening for regeneration is so formed as to expose a region of said dehumidification rotor, which second-mentioned region is so defined as to have a central angle and to be located in an area other than said first-mentioned region;
a heater for heating the air for regeneration before passing through said opening for regeneration;
a heat exchanger for recovering heat, which is separated into a first passage section through which the air for regeneration before passing through said opening for regeneration passes, and a second passage section through which the air for regeneration after passing through said opening for regeneration passes, which heat exchanger has a separation wall section that transfers heat of said air for regeneration passing through said second passage section to said air for regeneration passing through said first passage section;
a dehumidification passage harboring a dehumidification fan that inhales said air to be dehumidified from outside and discharges the air after passing through said opening for dehumidification;
a regeneration passage harboring a regeneration fan which flows said air for regeneration through said first passage section, said heater, said opening for regeneration and said second passage section, in the order mentioned; and
a flow guide plate which guides said air for regeneration that passed through anterior area of said dehumidification rotor to the upstream portion in said second passage section, said anterior area being located anterior in the direction of rotation, and which guides said air for regeneration that passed through said posterior area of said dehumidification rotor to the downstream portion in said second passage section, said posterior area being located posterior in the direction of rotation, which flow guide plate is arranged in said passage for regeneration at a position downstream of said opening for regeneration.

6. The dehumidifier according to claim 5, wherein said heat exchanger for recovering heat is arranged at a position located outside of said dehumidification rotor, when viewed in radial direction of said dehumidification rotor; said separation wall section is formed such that said first passage section extends from rear side to front side of said dehumidification rotor, and that said second passage section extends, in a prescribed length, along the outer periphery of said dehumidification rotor; and wherein said passage for regeneration is constituted such that said air for regeneration passes through said first passage section to move from the rear side to front side of said dehumidification rotor, then passes through said opening for regeneration to move from the front side to the rear side of said dehumidification rotor after passing said heater, then flows to said heat exchanger for recovering heat, then flows into said second passage section from the lateral side of said heat exchanger for recovering heat, extending along said dehumidification rotor, and then flows out of said second passage section after passing through said second passage section in a prescribed distance along the outer periphery of said dehumidification rotor.

7. The dehumidifier according to claim 5, wherein said heat exchanger for recovering heat is arranged at a position located outside of said dehumidification rotor, when viewed in radial direction of said dehumidification rotor; said separation wall section is formed such that said first passage section and said second passage section extend in a prescribed length, along the outer periphery of said dehumidification rotor; and wherein said passage for regeneration is constituted such that said air for regeneration passes through said first passage section to move from the rear side to front side of said dehumidification rotor, then passes through said opening for regeneration to move from the front side to the rear side of said dehumidification rotor after passing said heater, then flows to said heat exchanger for recovering heat, then flows into said second passage section from the lateral side of said heat exchanger for recovering heat, extending along said dehumidification rotor, and then flows out of said second passage section after passing through said second passage section in a prescribed distance along the outer periphery of said dehumidification rotor.

8. The dehumidifier according to claim 1, further comprising a heat exchanger for cooling which cools the air for regeneration after passing through said second passage section so as to condense moisture, thereby separating the moisture from the air for regeneration.

9. The dehumidifier according to claim 8, wherein said heat exchanger for cooling is arranged at a position anterior to said opening for dehumidification, by which the air for regeneration after passing through said second passage section is cooled using the air to be dehumidified before passing through said opening for dehumidification.

10. The dehumidifier according to claim 8, wherein said air for regeneration after passing through said heat exchanger for cooling is returned to a position upstream of said first passage section, and wherein said passage for regeneration constitutes a close circuit.

* * * * *